United States Patent
Liu et al.

(10) Patent No.: US 12,033,342 B2
(45) Date of Patent: Jul. 9, 2024

(54) METHODS, SYSTEMS AND COMPUTER MEDIUM FOR SCENE-ADAPTIVE FUTURE DEPTH PREDICTION IN MONOCULAR VIDEOS

(71) Applicants: Huan Liu, Hamilton (CA); Zhixiang Chi, North York (CA); Yuanhao Yu, Markham (CA); Yang Wang, Winnipeg (CA); Jin Tang, Markham (CA)

(72) Inventors: Huan Liu, Hamilton (CA); Zhixiang Chi, North York (CA); Yuanhao Yu, Markham (CA); Yang Wang, Winnipeg (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 492 days.

(21) Appl. No.: 17/203,645

(22) Filed: Mar. 16, 2021

(65) Prior Publication Data
US 2022/0301211 A1    Sep. 22, 2022

(51) Int. Cl.
*G06N 3/0455* (2023.01)
*G06F 18/214* (2023.01)
(Continued)

(52) U.S. Cl.
CPC ............ *G06T 7/579* (2017.01); *G06F 18/214* (2023.01); *G06N 3/08* (2013.01); *G06V 10/44* (2022.01);
(Continued)

(58) Field of Classification Search
None
See application file for complete search history.

(56) References Cited

U.S. PATENT DOCUMENTS

| 2019/0139257 A1 | 5/2019 | Choi et al. |
| 2019/0279383 A1* | 9/2019 | Angelova .............. G06N 3/044 |

(Continued)

FOREIGN PATENT DOCUMENTS

| CN | 109460815 A | 3/2019 |
| CN | 110728200 A | 1/2020 |
| WO | 2020012069 A1 | 1/2020 |

OTHER PUBLICATIONS

Klabjan, Diego, and Xiaofeng Zhu. "Neural network retraining for model serving." arXiv preprint arXiv:2004.14203 (2020). (Year: 2020).*

(Continued)

*Primary Examiner* — Sean M Conner

(57) ABSTRACT

Systems, methods and computer-readable medium for predicting a depth for a video frame are disclosed. An example method may include steps of: receiving a plurality of training data, each comprising a set of consecutive video frames and a depth representation of a subsequent video frame to the consecutive video frames; receiving a pre-trained neural network model $f_\theta$ having a plurality of weights $\theta$; while the pre-trained neural network model $f_\theta$ has not converged: computing a plurality of second weights $\theta_i'$, based on each set of consecutive video frames, and updating the plurality of weights $\theta$, based on the plurality of training data and the plurality of second weights $\theta_i'$; receiving a plurality of new consecutive video frames with consecutive timestamps; and predicting a depth representation of video frame immediately subsequent to the new consecutive video frames based on the updated plurality of weights $\theta$.

16 Claims, 5 Drawing Sheets

(51) Int. Cl.
G06N 3/08 (2023.01)
G06T 7/50 (2017.01)
G06T 7/579 (2017.01)
G06V 10/44 (2022.01)

(52) U.S. Cl.
CPC .............. G06T 2207/10028 (2013.01); G06T 2207/20081 (2013.01)

(56) References Cited

U.S. PATENT DOCUMENTS

2020/0160546 A1 5/2020 Gu et al.
2021/0073997 A1 3/2021 Vora et al.

OTHER PUBLICATIONS

Qi, Xiaojuan, et al. "3D motion decomposition for RGBD future dynamic scene synthesis." Proceedings of the IEEE/CVF Conference on Computer Vision and Pattern Recognition. 2019. (Year: 2019).*
Liu, Huan, et al. "Meta-Auxiliary Learning for Future Depth Prediction in Videos." 2023 IEEE/CVF Winter Conference on Applications of Computer Vision (WACV). IEEE, 2023. (Year: 2023).*
Anthony Hu, Fergal Cotter, Nikhil Mohan, Corina Gurau, Alex Kendall "Probabilistic future prediction for video scene understanding." arXiv preprint arXiv:2003.06409, 22 pages Jul. 17, 2020.
Finn, Chelsea, Pieter Abbeel, and Sergey Levine. "Model-agnostic meta-learning for fast adaptation of deep networks." International Conference on Machine Learning. PMLR, 13 pages Jul. 18, 2017.
Seyed shahabeddin Nabavi, Mrigank Rochan, and Yang Wang "Future semantic segmentation with convolutional LSTM." arXiv preprint arXiv:1807.07946, 12 pages Jul. 20, 2018.
Castrejon, Lluis, Nicolas Ballas, and Aaron Courville. "Improved conditional VRNNs for video prediction." Proceedings of the IEEE/CVF International Conference on Computer Vision. 10 pages Apr. 27, 2019.
Srivastava, Nitish, Elman Mansimov, and Ruslan Salakhudinov. "Unsupervised learning of video representations using LSTMs", 12 pages Jan. 4, 2016.
Dinesh Jayaraman, Frederik Ebert, Alexei A. Efros and Sergey Levine "Time-agnostic prediction: Predicting predictable video frames." arXiv preprint arXiv:1808.07784, 20 pages Oct. 23, 2018.
Tinghui Zhou, Matthew Brown, Noah Snavely, David G. Lowe, "Unsupervised learning of depth and ego-motion from video." Proceedings of the IEEE conference on computer vision and pattern recognition, 10 pages Aug. 1, 2017.
Zhichao Li, Naiyan Wang, Huangying Zhan, Chunhua Shen, Ming-Ming Cheng and Ian Reid, "Unsupervised scale-consistent depth and ego-motion learning from monocular video." arXiv preprint arXiv:1908.10553, 12 pages Oct. 3, 2019.
Wen Liu, Weixin Luo, Dongze Lian, and Shenghua Gao, "Future frame prediction for anomaly detection—a new baseline" Proceeding of the IEEE Conference on Computer Vision and Pattern Recognition, 10 pages Mar. 13, 2018.
Wei Yu, Yichao Lu, Steve Easterbrook, Sanja Fidler , Efficient and information-preserving future frame prediction and beyond. International Conference on Learning Representations, 14 pages Sep. 25, 2019.

* cited by examiner

500

510 receiving a plurality of training data
$$D_i = \left(D_i^{img}, D_i^{depth}\right), i = 1 \dots N$$

520 receiving a pre-trained neural network model $f_\vartheta$ having a plurality of weights θ

*While the neural network model $f_\vartheta$ has not converged*

530 computing a plurality of second weights θ', based on the plurality of consecutive video frames $D_i^{img}$ and the pre-trained neural network model $f_\vartheta$ 540 updating the plurality of weights θ, based on the plurality of training data $D_i$ and the plurality of second weights θ'

550 receiving a plurality of *m* new consecutive video frames with consecutive timestamps 560 predicting a depth representation of video frame immediately subsequent to the last video frame in the new consecutive video frames based on the updated plurality of weights θ

FIG. 5

METHODS, SYSTEMS AND COMPUTER MEDIUM FOR SCENE-ADAPTIVE FUTURE DEPTH PREDICTION IN MONOCULAR VIDEOS

REFERENCE TO RELATED APPLICATIONS

This is the first application for this disclosure.

FIELD

The present disclosure relates to predicting depth in monocular videos. Specifically, the present disclosure relates to generating depth estimation for monocular videos using a meta-learning approach.

BACKGROUND

With the burgeoning usage of social media and improvements in camera technology, especially in the context of smartphone devices, videos have become a core form of disseminating entertainment, education and awareness.

Every minute, hundreds of hours or more of new video content is uploaded to social media-based video sharing and streaming platforms. Most of the videos are monocular videos filmed with smartphone or other mobile devices. Accurate depth estimation for these videos is often needed across a wide range of tasks and applications. In addition, depth estimation is also important when it comes to analyzing surveillance videos, or when a vehicle needs to use a real time camera video feed to generate guidance for drivers or for a computing system onboard an autonomous driving vehicle.

One known technique for predicting a depth value for a video frame is using future frame prediction, where a future novel frame, in terms of RGB colours, is estimated based on past observed video frames or sequences. Such methods tend to generate blurry and distorted future frames. Most recent methods focus on extracting effective temporal representations from video frames and then predict a future frame according to the temporal representations.

In addition, some other methods concentrate on generating a semantic map for a future frame, where the semantic map may include data representing depth, optical flow and semantic maps altogether, and the accuracy of the predicted depth in a semantic map tends to be far from satisfactory.

The estimation of depth in a video relies on both temporal and spatial features of frames. Existing methods for predicting depth values for a future video frame using machine learning models is rather limited, as they are highly reliant on training data, which means the resulting machine learning model cannot be used to predict a depth for a future frame of a brand new video with a high accuracy.

SUMMARY

The present disclosure describes example embodiments implemented to predict a depth for a future video frame using neural network models trained using a meta-learning approach. Such neural network models, once trained using one set of training data from one or more videos, can quickly adapt to a novel environment (e.g., a new scene from a new video) with a very few samples from the novel environment, which means the trained neural network model can be used to predict a depth for a future frame in a new video based on as few as two or three existing video frames from the new video, achieving an improved computing efficiency in estimating depths values for the new video, and conserving computing resources at the same time.

The systems, methods and computer-readable medium disclosed herein can provide unique technical advantages such as quickly and efficiently generating estimated depth values for a video frame produced by monocular videos, as the system is configured to quickly adapt to novel video scenes using a meta-learning approach, with self-supervised training. The system can be used to predict depth values of a future video frame based on a few recent video frames from a current video, which may be used to generate a future state by a computing system on an autonomous vehicle to assist with navigation. The system is able to handle previously unseen video data with only a few batches of sample data, which means large-scale training datasets are not required for the system to adapt to new video scenes in order to generate estimated depth values for a frame in the new video.

In one aspect, the present disclosure provides a computer-implemented method for predicting a depth for a video frame, the method may include: receiving a plurality of training data $D_i = (D_i^{img}, D_i^{depth})$, $i=1 \ldots N$, and for each $D_i$: $D_i^{img} = (D_{i1}^{img}, D_{i2}^{img} \ldots D_{it}^{img})$, wherein $D_{i1}^{img}$, $D_{i2}^{img} \ldots D_{it}^{img}$ each respectively represents a video frame from a plurality of t consecutive video frames with consecutive timestamps; and $D_i^{depth}$ is a depth representation of a future video frame immediately subsequent to the video frame $D_{it}^{img}$; receiving a pre-trained neural network model $f_\theta$ having a plurality of weights $\theta$; while the pre-trained neural network model $f_\theta$ has not converged: computing a plurality of second weights $\theta_i'$, based on the plurality of consecutive video frames $D_i^{img}$ in each $D_i$, $i=1 \ldots N$ and the pre-trained neural network model $f_{\theta4}$, and updating the plurality of weights $\theta$, based on the plurality of training data $D_i = (D_i^{img}, D_i^{depth})$, $i=1 \ldots N$ and the plurality of second weights $\theta_i'$; receiving a plurality of m new consecutive video frames $D_{new} = (D_1^{new_{img}}, D_2^{new_{img}} \ldots D_m^{new_{img}})$ with consecutive timestamps; and predicting a depth representation of video frame $D_{m+1}^{new_{img}}$ immediately subsequent to the video frame $D_m^{new_{img}}$ based on the updated plurality of weights $\theta$.

In some embodiments, computing the plurality of second weights $\theta_i'$ may be based on the equation:

$$\theta_i' = \theta - \alpha \nabla L_{D_i}(f_\theta; D_i^{img}), i=1 \ldots N$$

wherein $\alpha$ represents a learning rate, $L_{D_i}$ represents a loss computed based on $(f_\theta; D_i^{img})$, and $\nabla$ denotes a gradient operator.

In some embodiments, updating the plurality of weights $\theta$ may be based on the equation:

$$\theta = \theta - \beta \Sigma_{i=1}^N \nabla L_{T_i}(f_{\theta_i'}; D_i^{img}, D_i^{depth})$$

wherein $\beta$ represents a learning rate, $L_{T_i}$ represents a loss computed based on $(f_{\theta_i'}; D_i^{img}, D_i^{depth})$ and $\nabla$ denotes a gradient operator.

In some embodiments, predicting the depth representation of video frame $D_{m+1}^{new\_img}$ may include the steps of: updating the plurality of second weights $\theta_i'$, based on the plurality of new consecutive video frames $D_{new} = (D_1^{new_{img}}, D_2^{new_{img}} \ldots D_m^{new_{img}})$ and the updated plurality of weights $\theta$; and generating the depth representation based on the updated plurality of second weights $\theta_i'$.

In some embodiments, updating the plurality of second weights $\theta_i'$ may be based on the equation:

$$\theta_i' = \theta - \alpha \nabla L_{D_i}(f_\theta; D_{new})$$

wherein $\alpha$ is the learning rate, $L_{D_i}$ represents a loss computed based on $(f_\theta; D_{new})$, and $\nabla$ denotes a gradient operator.

In some embodiments, a training process of the pre-trained neural network model $f_\theta$ may include a current frame reconstruction process and a future depth prediction process.

In some embodiments, the training process of the pre-trained neural network model $f_\theta$ may include: receiving a plurality of consecutive video frames $F_1^{img}, F_2^{img} \ldots F_j^{img}$ with consecutive timestamps; extracting a plurality of spatial features from the plurality of consecutive video frames $F_1^{img}, F_2^{img} \ldots F_j^{img}$; setting a plurality of initial parameters of $f_\theta$ with random values to be the plurality of weights $\theta$; extracting a plurality of spatial features from the plurality of consecutive video frames $F_1^{img}, F_2^{img} \ldots F_j^{img}$; during the current frame reconstruction process: reconstructing each of the plurality of consecutive video frames $F_1^{img}, F_2^{img} \ldots F_j^{img}$ based on the plurality of spatial features; and updating values for at least one of the plurality of weights $\theta$ based on the reconstructed video frames; and during the future depth prediction process: extracting temporal features of the plurality of consecutive video frames $F_1^{img}, F_2^{img} \ldots F_j^{img}$ based on the plurality of spatial features; generating a depth prediction for a video frame $F_{j+1}^{img}$ immediately subsequent to the video frame $F_j^{img}$ based on the temporal features of the plurality of consecutive video frames $F_1^{img}, F_2^{img} \ldots F_j^{img}$; and updating values for at least one of the plurality of weights $\theta$ based on the depth prediction for the video frame $F_{j+1}^{img}$.

In some embodiments, extracting the temporal features may include using a 3D convolutional neural network to extract the temporal features.

In some embodiments, the depth presentation of any video frame may include, for one or more surfaces in the video frame, a depth value representing an estimated distance from the respective surface from a viewpoint.

In some embodiments, the depth presentation of any video frame may be a depth map for the video frame.

In another aspect, a system for predicting a depth for a video frame is disclosed, the system may include: a processing unit; and a memory coupled to the processing unit, the memory storing machine-executable instructions that, when executed by the processing unit, cause the system to: receive a plurality of training data $D_i=(D_i^{img}, D_i^{depth})$, $i=1 \ldots N$, and for each $D_i$: $D_i^{img}=(D_{i1}^{img}, D_{i2}^{img} \ldots D_{it}^{img})$, wherein $D_{i1}^{img}, D_{i2}^{img} \ldots D_{it}^{img}$ each respectively represents a video frame from a plurality of t consecutive video frames with consecutive timestamps; and $D_i^{depth}$ is a depth representation of a future video frame immediately subsequent to the video frame $D_{it}^{img}$; receive a pre-trained neural network model $f_\theta$ having a plurality of weights $\theta$; while the pre-trained neural network model $f_\theta$ has not converged: compute a plurality of second weights $\theta_i'$, based on the plurality of consecutive video frames $D_i^{img}$ in each $D_i$, $i=1 \ldots N$ and the pre-trained neural network model $f_\theta$; and update the plurality of weights $\theta$, based on the plurality of training data $D_i=(D_i^{img}, D_i^{depth})$, $i=1 \ldots N$ and the plurality of second weights $\theta_i'$; receive a plurality of m new consecutive video frames $D_{new}=(D_1^{new_{img}}, D_2^{new_{img}} \ldots D_m^{new_{img}})$ with consecutive timestamps; and predict a depth representation of video frame $D_{m+1}^{new\_img}$ immediately subsequent to the video frame $D_m^{new_{img}}$ based on the updated plurality of weights $\theta$.

In some embodiments, computing the plurality of second weights $\theta_i'$ may be based on the equation:

$$\theta_i'=\theta-\alpha\nabla L_{D_i}(f_\theta;D_i^{img}), i=1 \ldots N$$

wherein $\alpha$ represents a learning rate, $L_{D_i}$ represents a loss computed based on ($f_\theta$; $D_i^{img}$), and $\nabla$ denotes a gradient operator.

In some embodiments, updating the plurality of weights $\theta$ may be based on the equation:

$$\theta=\theta-\beta\Sigma_{i=1}^N \nabla L_{T_i}(f_{\theta_i'};D_i^{img},D_i^{depth})$$

wherein $\beta$ represents a learning rate, $L_{T_i}$ represents a loss computed based on ($f_{\theta_i'}$; $D_i^{img}$, $D_i^{depth}$), and $\nabla$ denotes a gradient operator.

In some embodiments, predicting the depth representation of video frame $D_{m+1}^{new\_img}$ may include: updating the plurality of second weights $\theta_i'$, based on the plurality of new consecutive video frames $D_{new}=(D_1^{new_{img}}, D_2^{new_{img}} \ldots D_m^{new_{img}})$ and the updated plurality of weights $\theta$; and generating the depth representation based on the updated plurality of second weights $\theta_i'$.

In some embodiments, updating the plurality of second weights $\theta_i'$ may be based on the equation:

$$\theta_i'=\theta-\alpha\nabla L_{D_i}(f_\theta;D_i^{new_{img}}), i=1 \ldots m$$

wherein $\alpha$ is the learning rate, $L_{D_i}$ represents a loss computed based on ($f_\theta$; $D_i^{new_{img}}$), and $\nabla$ denotes a gradient operator.

In some embodiments, a training process of the pre-trained neural network model $f_\theta$ may include a current frame reconstruction process and a future depth prediction process.

In some embodiments, during the training process of the pre-trained neural network model $f_\theta$, the machine-executable instructions, when executed by the processing unit, cause the system to: receive a plurality of consecutive video frames $F_1^{img}, F_2^{img} \ldots F_j^{img}$ with consecutive timestamps; extract a plurality of spatial features from the plurality of consecutive video frames $F_1^{img}, F_2^{img} \ldots F_j^{img}$; set a plurality of initial parameters of $f_\theta$ with random values to be the plurality of weights $\theta$; extract a plurality of spatial features from the plurality of consecutive video frames $F_1^{img}, F_2^{img} \ldots F_j^{img}$; during the current frame reconstruction process: reconstruct each of the plurality of consecutive video frames $F_1^{img}, F_2^{img} \ldots F_j^{img}$ based on the plurality of spatial features; and update values for at least one of the plurality of weights $\theta$ based on the reconstructed video frames; and during the future depth prediction process: extract temporal features of the plurality of consecutive video frames $F_1^{img}, F_2^{img} \ldots F_j^{img}$ based on the plurality of spatial features; generate a depth prediction for a video frame $F_{j+1}^{img}$ immediately subsequent to the video frame $F_j^{img}$ based on the temporal features of the plurality of consecutive video frames $F_1^{img}, F_2^{img} \ldots F_j^{img}$; and update values for at least one of the plurality of weights $\theta$ based on the depth prediction for the video frame $F_{j+1}^{img}$.

In some embodiments, during extracting the temporal features, the machine-executable instructions, when executed by the processing unit, cause the system to: use a 3D convolutional neural network to extract the temporal features.

In some embodiments, the depth presentation of any video frame may include, for one or more surfaces in the video frame, a depth value representing an estimated distance from the respective surface from a viewpoint.

In some embodiments, the depth presentation of any video frame may be a depth map for the video frame.

In another aspect, a non-transitory computer readable medium storing machine-readable instructions for configuring a processing unit to predict a depth for a video frame is disclosed, the machine-readable instructions are configured to processing unit to: receive a plurality of training data $D_i=(D_i^{img}, D_i^{depth})$, $i=1 \ldots N$, and for each $D_i$: $D_i^{img}=(D_{i1}^{img}, D_{i2}^{img} \ldots D_{it}^{img})$, wherein $D_{i1}^{img}, D_{i2}^{img} \ldots D_{it}^{img}$ each respectively represents a video frame from a plurality of t consecutive video frames with consecutive timestamps; and $D_i^{depth}$ is a depth representation of a future video frame immediately subsequent to the video frame $D_{it}^{img}$; receive a pre-trained neural network model $f_\theta$ having a plurality of weights $\theta$; while the pre-trained neural network model $f_\theta$ has not converged: compute a plurality of second weights $\theta_i'$, based on the plurality of consecutive video frames $D_i^{img}$ in each $D_i$, i=1 . . . N and the pre-trained neural network model $f_\theta$; and update the plurality of weights $\theta$, based on the plurality of training data $D_i=(D_i^{img}, D_i^{depth})$, i=1 . . . N and the plurality of second weights $\theta_i'$; until the pre-trained neural network model f$\theta$ has converged: receive a plurality of m new consecutive video frames $D_{new}=(D_1^{new_{img}}, D_2^{new_{img}} . . . D_m^{new_{img}})$ with consecutive timestamps; and predict a depth representation of video frame $D_{m+1}^{new_{img}}$ immediately subsequent to the video frame $D_m^{new_{img}}$ based on the updated plurality of weights $\theta$.

BRIEF DESCRIPTION OF THE DRAWINGS

Reference will now be made, by way of example, to the accompanying drawings which show example embodiments of the present application, and in which:

FIG. 5 illustrates an example method for training a neural network model to predict a depth of a future video frame using a meta-learning approach, in accordance with some example embodiments.

Similar reference numerals may have been used in different figures to denote similar components.

DESCRIPTION OF EXAMPLE EMBODIMENTS

Figure 1:
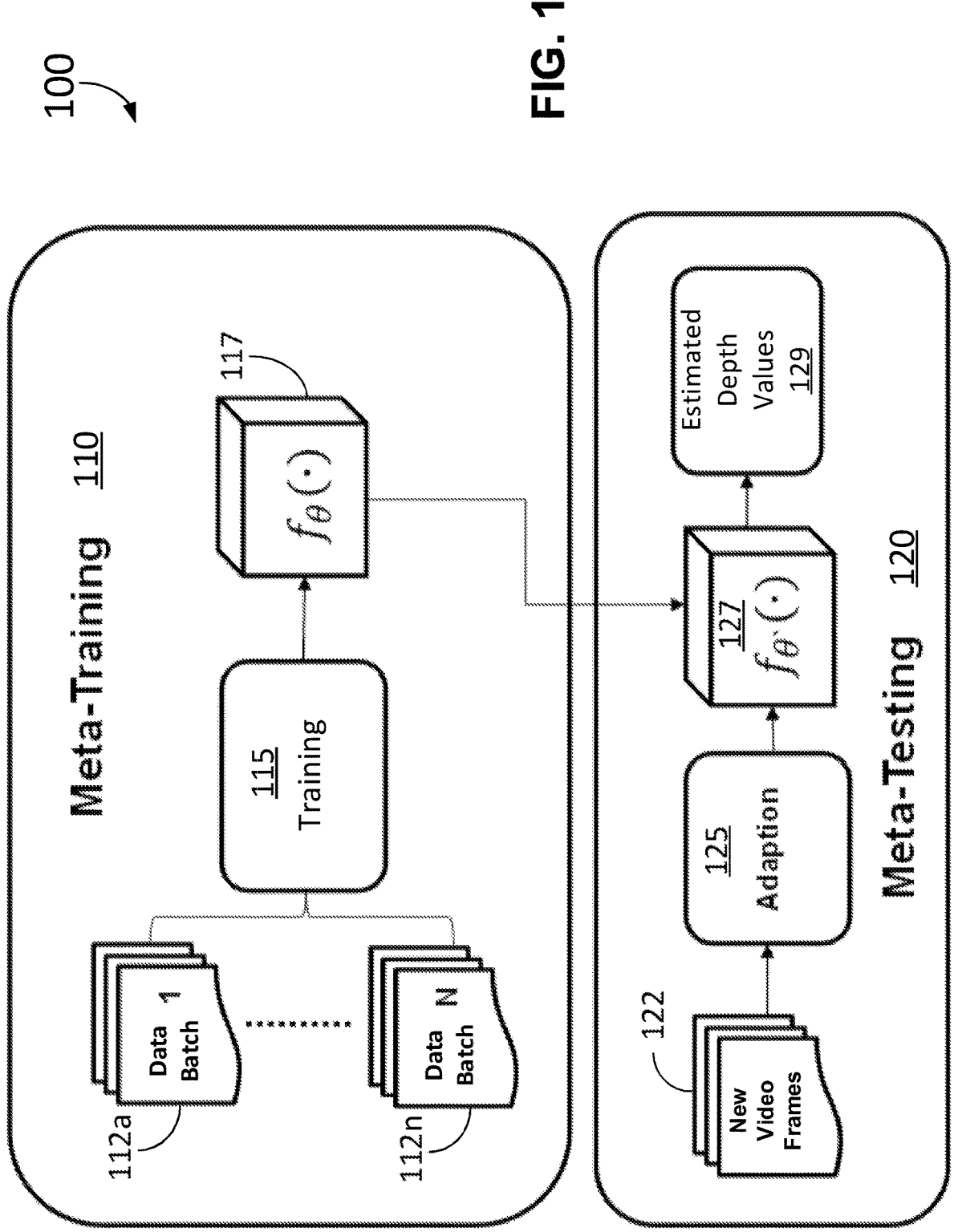
FIG. 1 is a block diagram illustrating an example system for training a neural network model for predicting a depth of a future video frame using a meta-learning approach, in accordance with some example embodiments.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

As used herein, a "module" or "operation" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, a general processing unit, an accelerator unit, or another hardware processing circuit. In some examples, module can refer to a purpose configured hardware processing circuit.

As used here, a "model" can refer to a combination of a hardware processing circuit and machine-readable instructions (software and/or firmware) executable on the hardware processing circuit that is configured to apply a processing function to input data to generate a corresponding output. A "machine learning model" can refer to a model for which the processing function has been learned or trained using machine learning (ML) techniques. Machine learning models can include but not limited to models that are based on or more of Convolution Neural Network (CNN), Recurrent Neural Network (RNN), Long Short-Term Memory (LSTM) and/or transformer architectures. Other possible types of machine learning classification modules include models that are based on decision tree algorithms, support vector machine algorithms, and logistic regression algorithms.

As mentioned, current future frame prediction methods usually focus on predicting future frames in terms of RGB values, or semantic maps. These methods usually have poor adaptivity, which means the machine learning models need to be trained on a new, large-scale dataset before it can be used to predict a depth value for a new video. In this disclosure, novel methods are described to predict depth values for a future video frame without having to first obtain the RGB values for the future video frame, and using only a few samples (e.g., video frames) of the new video to make the prediction. The systems and methods disclosed herein provide a technical solution that requires less computing resource and less time than known approaches to estimate depth values for a frame in a given video.

In some example embodiments, a meta-learning approach is used to help train a machine learning (e.g., neural network) model to quickly adapt to a novel environment with just a few samples. The basic concept of meta-learning is to teach a pre-trained machine learning model to generalize based on a new set of training data (e.g., video frames from a new video) quickly and efficiently, when the pre-trained models generally have difficulties adapting to new video scenes without extensive training.

In some embodiments, during meta-learning, a pre-trained machine learning model can be trained to adapt to a specific type of environment or scene based on training data that are readily available for that environment (e.g., frames from a new video showing the environment), and deployed to generate depth values for a future video frame in the same or similar environment in a computationally efficient manner.

FIG. 1 is a block diagram illustrating an example meta-learning system 100 for training a pre-trained neural network model 117 for predicting depth values 129 of a future video frame using a meta-learning approach, in accordance with some example embodiments. The system 100 includes a meta-training component 110 and a meta-testing component 120. A pre-trained machine learning model 117 may be, for example, a neural network model 117.

In some embodiments, a pre-trained neural network model 117 may be a neural network model $f_\theta$ 117 executed to receive a plurality of video frames $F_1, F_2, \ldots F_j$ with consecutive timestamps, and generate a set of depth values for the next immediately video frame $F_{j+1}$ based on the spatial and temporal features of the plurality of video frames $F_1, F_2, \ldots F_j$. For example, the neural network model $f_\theta$ 117 may have been pre-trained using Convolution Neural Networks (CNNs), Recurrent Neural Networks (RNNs), and/or Long Short-Term Memories (LSTMs). A neural network model $f_\theta$ 117, once pre-trained, may have a plurality of parameters or weights, collectively represented by $\theta$, as learned from the spatial and/or temporal features of the plurality of video frames $F_1, F_2, \ldots F_j$.

Figure 2:
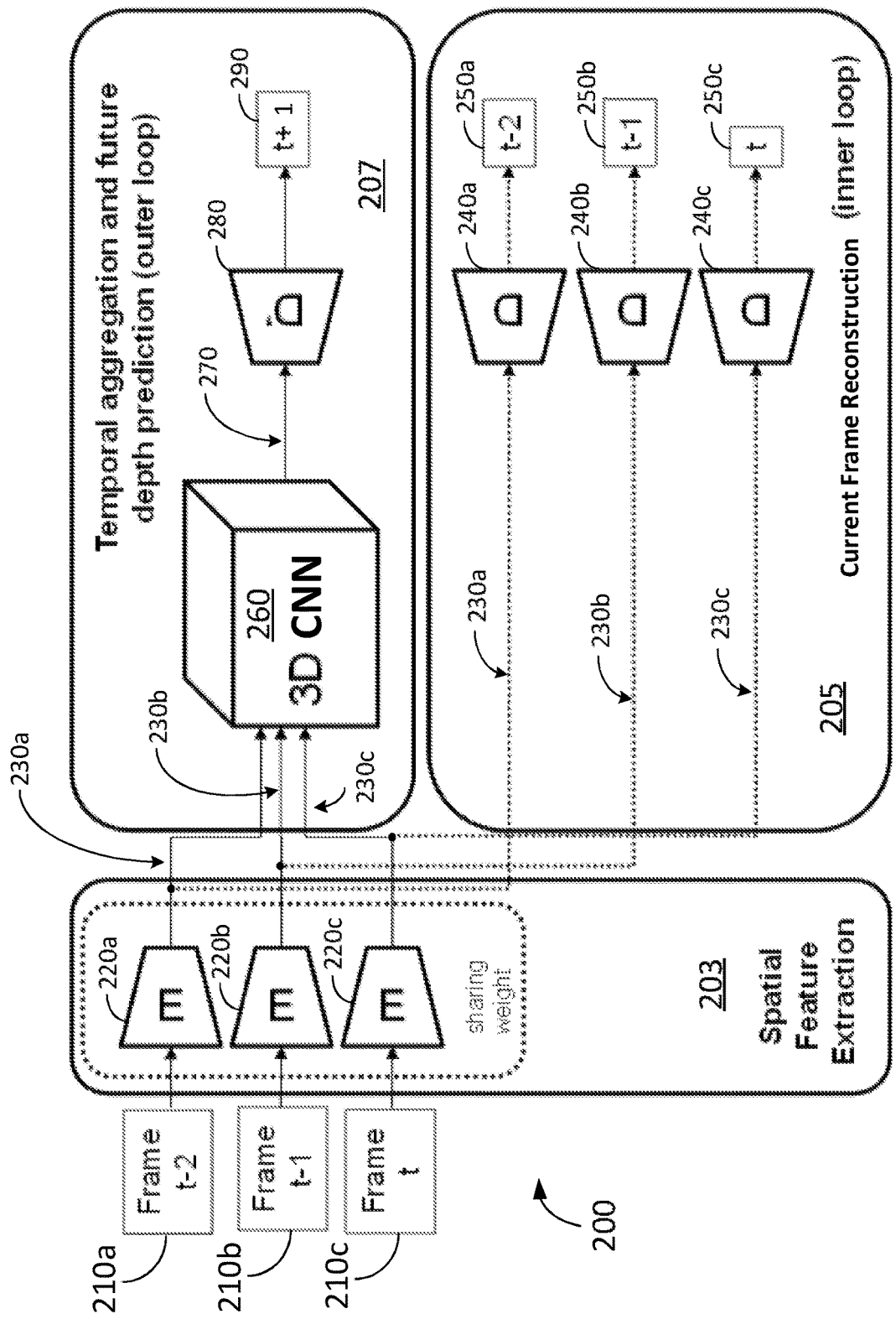
FIG. 2 is a block diagram illustrating an example system for pre-training a neural network model for predicting a depth of a future video frame, in accordance with some example embodiments.

Example processes of pre-training a neural network model is described next in detail with respect to FIGS. 2 and 3. FIG. 2 is a block diagram illustrating an example system 200 for pre-training a neural network model for predicting a depth of a future video frame, in accordance with some example embodiments. Specifically, the example system 200 is configured to generate and refine weights $\theta$ of a neural network model $f_\theta$ for predicting a depth of a future video frame. The plurality of weights $\theta$ may first be set or initialized with random values prior to the start of the pre-training of model $f_\theta$, and updated throughout the pre-training process by the system 200.

The system 200 may include a spatial feature extraction branch or process 203, current frame reconstruction branch or process 205 and a future depth prediction branch or process 207. A plurality of consecutive video frames may be received by the system 200. The plurality of consecutive video frames may be represented as $F_1^{img}, F_2^{img} \ldots F_j^{img}$, where j indicates a total number of consecutive video frames, and can be any positive natural number starting with 2. In this particular example, the system 200 receives three consecutive video frames $F_1^{img}$ 210a, $F_2^{img}$ 210b, $F_3^{img}$ 210c, having consecutive timestamps t−2, t−1, and t, respectively. The third video frame $F_3^{img}$ 210c is the most recent and noted as the current frame.

The system 200 includes a plurality of spatial feature extraction encoders 220a, 220b, 220c, from which a respective encoder is assigned for each of the plurality of consecutive video frames $F_1^{img}$ 210a, $F_2^{img}$ 210b, $F_3^{img}$ 210c. During the spatial feature extraction process 203, the spatial feature extraction encoder 220a is configured to receive the video frame $F_1^{img}$ 210a as input, and generate a plurality of spatial features 230a and associated weights $\theta_{F1}$ for the spatial features 230a. The spatial feature extraction encoder 220b is configured to receive the video frame $F_2^{img}$ 210b as input, and generate a plurality of spatial features 230b and associated weights $\theta_{F2}$ for the spatial features 230b. The spatial feature extraction encoder 220c is configured to receive the video frame $F_3^{img}$ 210c as input, and generate a plurality of spatial features 230c and associated weights $\theta_{F3}$ for the spatial features 230c. The weights $\theta_{F1}, \theta_{F2}, \theta_{F3}$ can be part of the plurality of weights $\theta$, and updated throughout the current frame reconstruction process 205.

During the current frame reconstruction branch or process 205, a respective decoder 240a, 240b, 240c can be configured to reconstruct, respectively, each of the plurality of consecutive video frames $F_1^{img}$ 210a, $F_2^{img}$ 210b, $F_3^{img}$ 210c based on the plurality of spatial features 230a, 230b, 230c from the spatial feature extraction process 203. In some embodiments, the decoder 240a may share weights $\theta_{F1}$ with the encoder 220a to reconstruct the video frame $F_1^{img}$ with the output being a reconstructed video frame 250a; the decoder 240b may share weights $\theta_{F2}$ with the encoder 220b to reconstruct the video frame $F_2^{img}$ with the output being a reconstructed video frame 250b; and the decoder 240c may share weights $\theta_{F3}$ with the encoder 220c to reconstruct the video frame $F_3^{img}$ with the output being a reconstructed video frame 250c. During this process, values for at least one of the plurality of weights $\theta_{F1}, \theta_{F2}, \theta_{F3}$ may be updated based on the reconstructed video frames 250a, 250b, 250c.

During the future depth prediction branch or process 207, a 3D Convolutional Neural Network (CNN) 260 is configured to extract temporal features 270 of the plurality of consecutive video frames $F_1^{img}, F_2^{img}, F_3^{img}$ based on the plurality of spatial features 230a, 230b, 230c, and a decoder 280 is configured to generate a depth prediction 290 for a video frame $F_4^{img}$ immediately subsequent to the video frame $F_3^{img}$ based on the temporal features of the plurality of consecutive video frames 270 of the plurality of consecutive video frames $F_1^{img}, F_2^{img}, F_3^{img}$. During this process, values for at least one of the plurality of weights $\theta_{F1}, \theta_{F2}, \theta_{F3}$ may be updated based on the depth prediction 290. In some embodiments, the future depth prediction process 207 only takes the spatial features from the most current video frame $F_3^{img}$ 210c for concatenation. The system 200 can be directly used for estimated depth values for a video frame that is subsequent to the plurality of consecutive video frames $F_1^{img}, F_2^{img}, F_3^{img}$.

Figure 3:
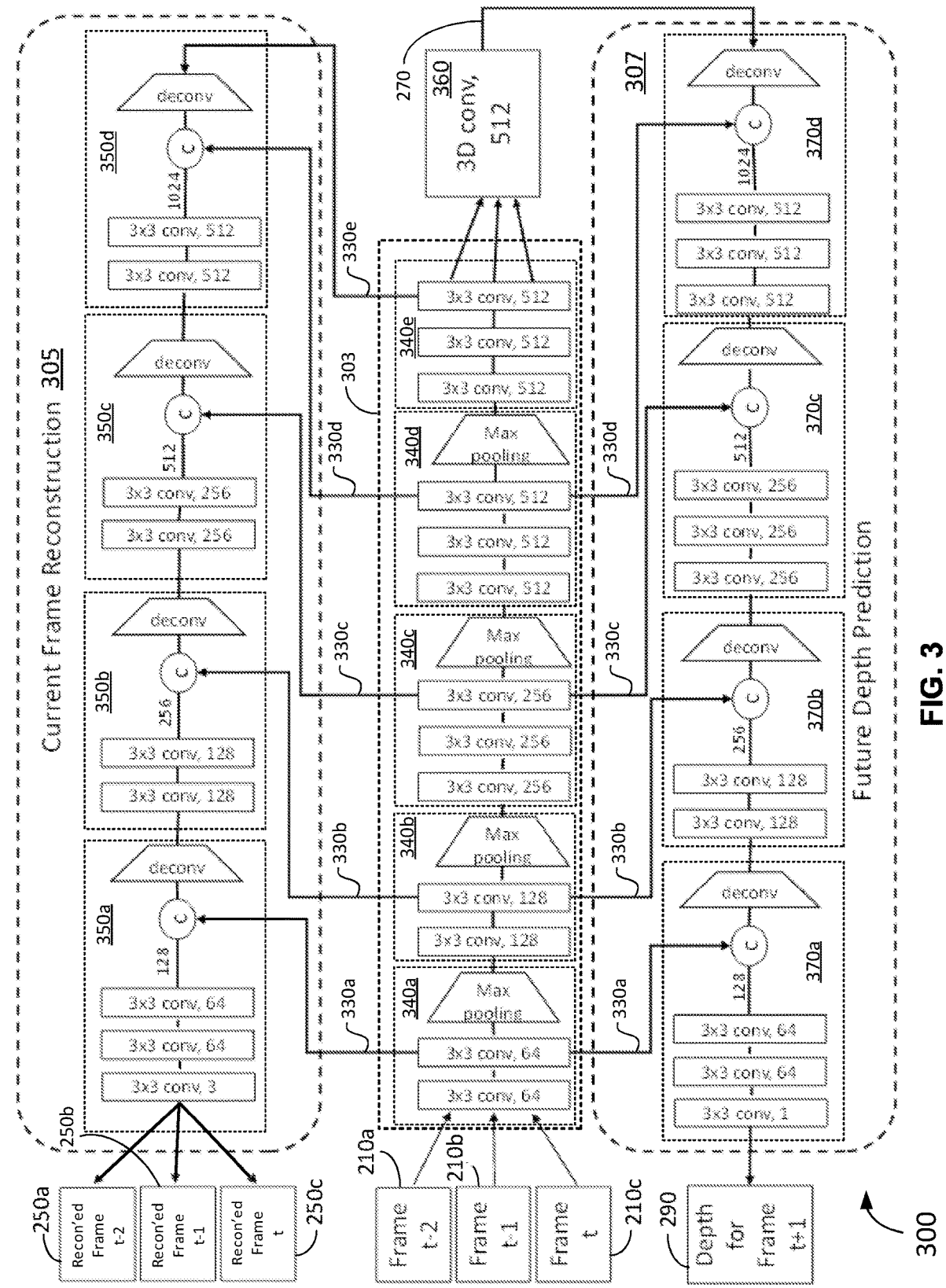
FIG. 3 illustrates a detailed example system for pre-training a neural network model for predicting a depth of a future video frame, in accordance with some example embodiments.

FIG. 3 illustrates a detailed example system 300 for pre-training a neural network model $f_\theta$ 117 for predicting a depth of a future video frame, in accordance with some example embodiments. Similar to the system 200 illustrated in FIG. 2, the system 300 may include a spatial feature extraction branch or process 303, current frame reconstruction branch or process 305 and a future depth prediction branch or process 307. A plurality of consecutive video frames may be received by the system 300. The plurality of consecutive video frames may be represented as $F_1^{img}, F_2^{img} \ldots F_j^{img}$, where j indicates a total number of consecutive video frames, and can be any positive natural number starting with 2. In this particular example, the system 300 receives three consecutive video frames $F_1^{img}$ 210a, $F_2^{img}$ 210b, $F_3^{img}$ 210c, having consecutive timestamps t−2, t−1, and t, respectively. The third video frame $F_3^{img}$ 210c is the most recent and noted as the current frame.

During the spatial feature extraction process 303, an encoder, which may include multiple 2D convolution layers 340a, 340b, 340c, 340d, 340e, may be used to extract the spatial features 230a, 230b, 230c from the input $F_1^{img}$ 210a, $F_2^{img}$ 210b, $F_3^{img}$ 210c. Each 2D convolution layer 340a, 340b, 340c, 340d, 340e may include at least one 2D convolutional neural network (CNN). For example, "3×3 conv, 64" represents a 2D CNN with 3×3 kernel and 64 output channels for outputting the spatial features. For another example, '3×3 conv, 128' represents a 2D CNN with 3×3 kernel and 128 output channels for outputting the spatial features. For yet another example, '3×3 conv, 256' represents a 2D CNN with 3×3 kernel and 256 output channels for outputting the spatial features. In some of the 2D convolution layers 340a, 340b, 340c, 340d, which includes two or more 2D CNNs, a pooling layer (e.g., a max pooling filter) may be applied to down sample the spatial features generated by the 2D CNNs.

Each of the 2D convolution layers 340a, 340b, 340c, 340d, 340e may generate a set of spatial features 330a, 330b, 330c, 330d, 330e, which are passed onto the decoders in the current frame reconstructions process 305 and the decoders in the future depth prediction process 307.

In the current frame reconstructions process 305, a decoder may include multiple devolution layers 350a, 350b, 350c, 350d to generate the reconstructed video frames 250a, 250b, 250c based on the spatial features 330a, 330b, 330c, 330d, 330e. Each of the devolution layers 350a, 350b, 350c, 350d may include a deconvolutional neural network (shown as 'deconv') and multiple 2D CNNs (e.g., '3×3 conv, 512'). The numbers '1024', '512', '256', '128' after each concatenation operation (shown as 'C') represents the number of spatial features after the respective concatenation operation.

In the future depth prediction process 307, the set of spatial features 330e from the spatial feature extraction process 303 are sent to a 3D CNN 360, which then process the spatial features 330e to generate temporal features 270 which are then passed onto a decoder. The decoder may include multiple devolution layers 370a, 370b, 370c, 370d to generate the depth prediction 290 for the video frame $F_4^{img}$ immediately subsequent to the video frame $F_3^{img}$, based on the spatial features 330a, 330b, 330c, 330d, 330e. Each of the devolution layers 370a, 370b, 370c, 370d may include a deconvolutional neural network (shown as 'deconv') and multiple 2D CNNs (e.g., '3×3 conv, 256'). The numbers '1024', '512', '256', '128' after each concatenation operation represents the number of spatial features after the respective concatenation operation. In some embodiments, the future depth prediction process 307 only takes the spatial features from the most current video frame $F_3^{img}$ 210c for concatenation.

During both processes 305 and 307, values for some of the plurality of weights θ of the neural network model $f_θ$ 117 may be updated based on the reconstructed video frames 250a, 250b, 250c, and/or the depth prediction 290.

As mentioned, a pre-trained neural network model 117 generally has difficulties adapting to new video scenes without extensive training. Referring back to FIG. 1, the meta-learning system 100 is designed to re-train the pre-trained neural network model 117 to predict depth values for a frame in a new video with a few iterations of training based on only a few frames 122 from the new video, as further described below. In some embodiments, meta-learning system 100 may implement a Model-Agnostic Meta-Learning (MAML) approach to update the weights θ of pre-trained neural network model 117, which may include a meta-training component 110 and a meta-testing component 120.

Within the meta-training component 110, N batches of input data 112a ... 112n may be obtained. Each batch of input data 112a or 112n may be represented by $D_i=(D_i^{img}, D_i^{depth})$, where $D_i^{img}$ and $D_i^{depth}$ are randomly sampled data. i indicates different batches, ranging from 1 to N, where N is the total number of batches. To be more specific, $D_i^{img}$ and $D_i^{depth}$ are paired data: $D_i^{img}$ includes a plurality of consecutive video frames in terms of RGB values (e.g., $D_{i\_1}^{img}$, $D_{i\_2}^{img}$, $D_{i\_3}^{img}$); and $D_i^{depth}$ represents depth values (e.g., ground truth) of a future video frame $D_{i+1}^{img}$ immediately subsequent to $D_i^{img}$. Depth values may be represented in a matrix corresponding to RGB values. For example, $D_i^{depth}$ may be a matrix, where each element of the matrix corresponds to a depth value (e.g., 2 meters) for a respective pixel (or a respective group of pixels) of the video frame $D_{i+1}^{img}$. A depth value may represent a distance between a surface to which the pixel (or group of pixels) belongs and the viewpoint of the camera used to take the video. For instance, for a video frame containing a scene involving a table, a depth value may represent a distance (e.g., 0.8 meters) from a pixel (or a group of pixels) showing a surface of the table to the viewpoint of the camera.

In some embodiments, $D_i^{depth}$ containing depth values for a video frame may be represented as a depth map, which may be a graphical representation based on the depth values. In a depth map, depth values may be depicted by one or more colours based on a predetermined set of rules, which may include, for example: depth values within a first range (e.g., 0-2 meters) are represented by a first colour (e.g., red), depth values within a second range (e.g., 2.1 to 5 meters) are represented by a second colour (e.g., yellow), depth values within a third range (e.g., beyond 5 meters) are represented by a third colour (e.g., blue), and so on.

Through the training process 115 in the meta-training component 110, the N batches of data 112a ... 112n are used to train the pre-trained neural network model $f_θ$ 117, which may include a current frame reconstruction phase (referred to as an inner loop update), and a future depth prediction phase (referred to as an outer loop update).

In some embodiments, the meta-training component 110 is configured to adapt the pre-trained neural network model $f_θ$ 117 to a new task by updating the existing weights θ of the pre-trained neural network model $f_θ$ 117 to updated weights $θ_i'$. The updated weights $θ_i'$ may be computed using one or more gradient descent updates on the new task.

During the current frame reconstruction phase of training process 115, the pre-trained neural network model $f_θ$ 117 with a loss of L1 may be adapted for current frame reconstruction using $D_i^{img}$, and one gradient update may be used to update the weights of a spatial feature encoder (e.g., encoders 220a, 220b, 220c) and the weights of the spatial feature decoder (e.g., decoders 230a, 230b, 230c) from θ to $θ_i'$ based on the equation:

$$θ_i' = θ - α∇L_{D_i}(f_θ; D_i^{img}), i=1 \ldots N \quad (1)$$

where α represents a learning rate or step size, $L_{D_i}$ represents a loss computed based on ($f_θ$; $D_i^{img}$), ∇ denotes a gradient operator, and N is the total number of training data batches.

At this point, $θ_i'$, which may be referred to as a set or plurality of second weights, is the updated model weights of the pre-trained neural network model $f_θ$ 117 by data $D_i^{img}$. $L_{D_i}$ can be configured to minimize the loss L1 of reconstructed current frame with ground truth (e.g., a frame from $D_i^{img}$).

After the adapted model weights θ' including $θ_i'$ are obtained using equation (1) above, the pre-trained neural network model $f_θ$ 117 with weights θ' may be performed during a future depth prediction phase with paired data $D_i=(D_i^{img}, D_i^{depth})$, i=1 ... N for an outer loop update. The goal of the outer loop update is to ensure the features from the spatial feature encoder is suitable for predicting depth values for a future video frame. Each iteration of the outer loop update may update the plurality of weights θ is based on the equation:

$$θ = θ - β Σ_{i=1}^{N} ∇L_{T_i}(f_{θ_i'}; D_i^{img}, D_i^{depth}) \quad (2)$$

where β represents a learning rate or step size, $L_{T_i}$ represents a loss computed based on ($f_{θ_i'}$; $D_i^{img}$, $D_i^{depth}$), N is the total number of training data batches, and ∇ denotes a gradient operator.

In some embodiments, $L_{T_i}$ is configured to calculate loss L1, which represents a distance between predicted future depth of the video frame and ground truth $D_i^{depth}$.

The loss function $L_{D_i}$ from equation (1) and $L_{T_i}$ from equation (2) may be configured, for example, based on the equations below:

$$L_{D_i} = \|f_θ(D_i^{img}) - D_i^{img}\|_1$$

$$L_{T_i} = \|f_{θ'}(D_i^{img}) - D_i^{depth}\|_1$$

During the meta-testing component 120, the pre-trained neural network model $f_\theta$ 117 with updated weights $\theta$ may be trained based on previously unseen data to quickly and efficiently generate a depth prediction for a future video frame. In some embodiments, the previously unseen data may include a plurality of m new consecutive video frames 122, represented as $D_{new}=(D_1^{new_{img}}, D_2^{new_{img}} \ldots D_m^{new_{img}})$ with consecutive timestamps.

During meta-testing, a few videos frames from the plurality of m new consecutive video frames 122 may be used as input to conduct the inner loop update with equation (1) during an adaption process 125, and obtain the adapted neural network model with updated plurality of second weights $\theta_i'$. Then the neural network model 127 may be applied the rest of the plurality of m new consecutive video frames 122 to measure its performance. At last, the system 100 may generate a depth representation 129 of video frame $D_{m+1}^{new_{img}}$ immediately subsequent to the video frame $D_m^{new_{img}}$ based on the neural network model 127 with updated plurality of weights $\theta$. In some embodiments, a depth representation 129 of video frame $D_{m+x}^{new_{img}}$ subsequent to the video frame $D_m^{new_{img}}$ based on the neural network model 127 with updated plurality of weights $\theta$.

An overall example process performed by the meta-learning system 100 is presented below using pseudo code, as a non-limiting example. During the meta-training component 110:

Input: $\theta$, $D=(D^{img}, D^{depth})$
While not converged:
　Sample a batch of training pairs: $D_i=(D_i^{img}, D_i^{depth})$ in $D=(D^{img}, D^{depth})$, do:
　　For each image $D_i^{img}$ in $D_i$, do:
　　　Inner-loop update (current frame reconstruction):

$$\theta_i'=\theta-\alpha\nabla L_{D_i}(f_\theta; D_i^{img})$$

End For
　outer-loop update (future depth prediction):

$$\theta=\theta-\beta\Sigma_{i=1}^N \nabla L_{T_i}(f_{\theta_i'}; D_i^{img}, D_i^{depth})$$

Output: weights $\theta$ of the neural network model $f_\theta$
N may be a total number of training data batches.
During the meta-testing component 120:
Input: $\theta$, $D=(D^{img})$
While not converged:
　Sample a new batch of testing data $D_i=(D_i^{img})$
　For $D_i=(D_i^{img})$ in $D=(D^{img})$ do:
　　Inner-loop update (current frame reconstruction):

$$\theta_i'=\theta-\alpha\nabla L_{D_i}(f_\theta; D_i^{img})$$

End For
Inference:

$$\text{Estimated\_Depth\_Values}=f(\theta'(D^{img}))$$

Output: Estimated_Depth_Values
The output Estimated_Depth_Values is the final output 129 of the system 100.

Figure 4:
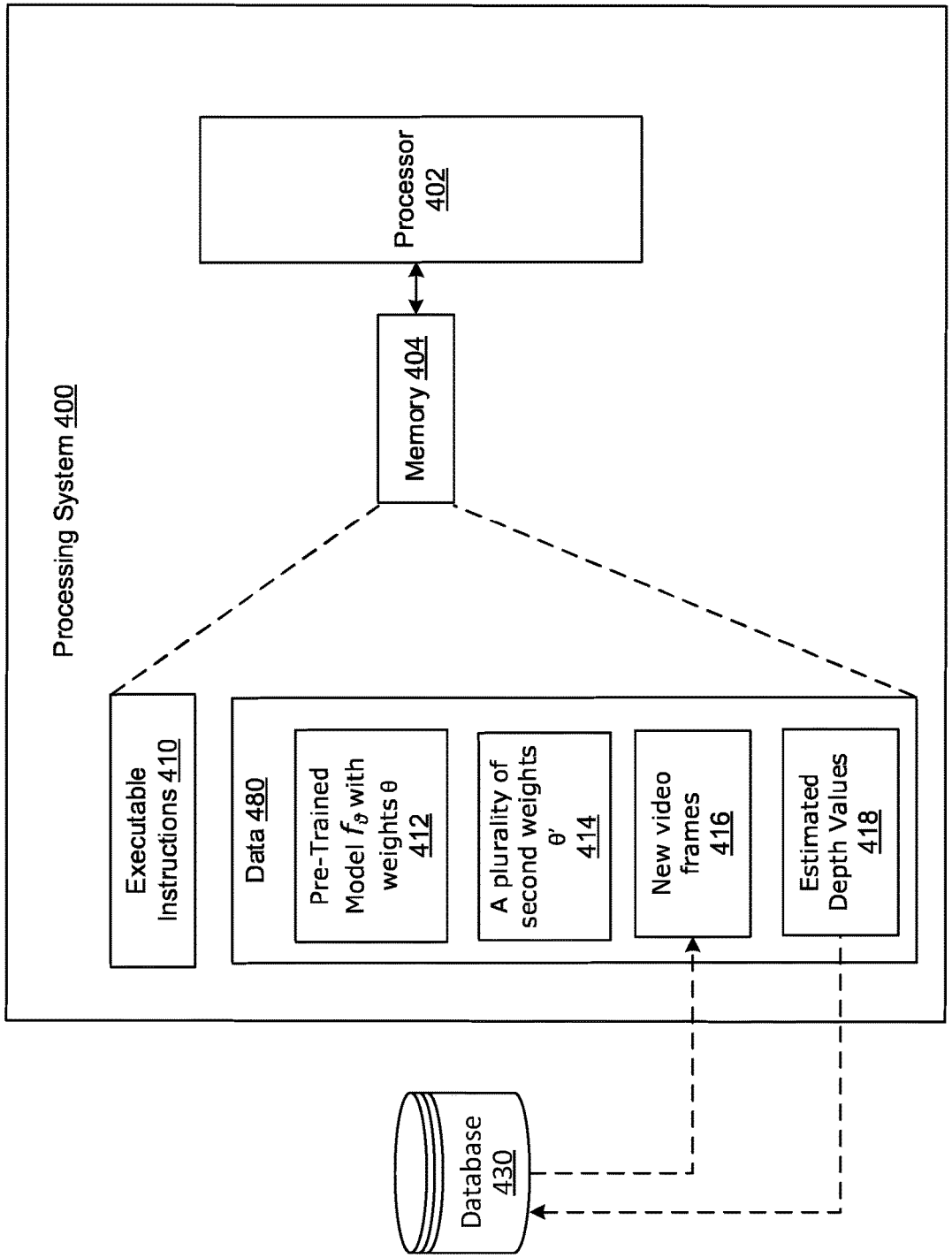
FIG. 4 illustrates an example hardware environment for implementing system including a trained neural network model for predicting a depth of a future video frame, in accordance with some example embodiments.

FIG. 4 illustrates a block diagram 400 of an example processing system 400 operable to implement a meta-learning system 100. The processing system 400 includes a processor 402 for executing computer program instructions, and a memory 404 for storing executable instructions and data. The processing system may be connected to a database 430 for obtaining new video frames 416 and storing the estimated depth values 418 for any video frame.

The processor 402 may be embodied as any processing resource capable of executing computer program instructions, such as one or more processors on a computer or computing platform(s). The memory 404 may be embodied as any data storage resource, such as one or more disk drives, random access memory, or volatile or non-volatile memory on one or more computing platforms.

The memory 404 has stored thereon several types of computer programs in the form of executable instructions. It has thereon a set of executable instructions 410 for carrying out the methods described herein. It also has stored thereon one or more sets of instructions of trained neural networks or other machine learned models to generate estimated depth values for one or more video frames.

The memory 404 may have stored thereon several types of data 480. The data 480 may include, for example, matrix representations 412 representing pre-trained neural network model $f_\theta$ with weights $\theta$. The matrix representations 412 may include matrices or weights used as input to a neural network (e.g., pre-trained neural network model $f_\theta$), as well as matrices updated or generated by the neural network. The data 480 may also include matrix representations 414 representing a plurality of second weights $\theta'$ as updated during the training process 115 and adaption process 125 in system 100. The data 480 may further include matrix representations 416 representing a plurality of new video frames and matrix representations 418 representing estimated depth values for a future video frame generated based on the plurality of new video frames 416.

FIG. 5 illustrates an example method 500 for training a neural network model to predict a depth of a future video frame using a meta-learning approach, in accordance with some example embodiments. The method 500 may be performed by the system 100, for example.

At operation 510, the system may receive a plurality of training data $D_i=(D_i^{img}, D_i^{depth})$, $i=1 \ldots N$, and for each $D_i$: $D_i^{img}=(D_{i1}^{img}, D_{i2}^{img} \ldots D_{it}^{img})$. $D_{i1}^{img}, D_{i2}^{img} \ldots D_{it}^{img}$ each respectively represents a video frame from a plurality of t consecutive video frames with consecutive timestamps, and $D_i^{depth}$ is a depth representation of a future video frame immediately subsequent to the video frame $D_{it}^{img}$.

At operation 520, the system may receive a pre-trained neural network model $f_\theta$ having a plurality of weights $\theta$. This neural network model may be pre-trained based on a process described in FIG. 2 or FIG. 3. The pre-trained neural network model $f_\theta$ may be stored on a memory of a computing system for quick retrieval and update.

In some embodiments, a training process of the pre-trained neural network model $f_\theta$ may include a current frame reconstruction process and a future depth prediction process.

In some embodiments, during the training process of the pre-trained neural network model $f_\theta$, a system, which may be a separate system from system 100, may: receive a plurality of consecutive video frames $F_1^{img}, F_2^{img} \ldots F_j^{img}$ with consecutive timestamps; extract a plurality of spatial features from the plurality of consecutive video frames $F_1^{img}, F_2^{img} \ldots F_j^{img}$; set a plurality of initial parameters of $f_\theta$ with random values to be the plurality of weights $\theta$; extract a plurality of spatial features from the plurality of consecutive video frames $F_1^{img}, F_2^{img} \ldots F_j^{img}$; during the current frame reconstruction process: reconstruct each of the plurality of consecutive video frames $F_1^{img}, F_2^{img} \ldots F_j^{img}$ based on the plurality of spatial features; and update values for at least one of the plurality of weights $\theta$ based on the reconstructed video frames; and during the future depth prediction process: extract temporal features of the plurality of consecutive video frames $F_1^{img}, F_{img}^2 \ldots F_j^{img}$ based on the plurality of spatial features; generate a depth prediction for a video frame $F_{j+1}^{img}$ immediately subsequent to the video frame $F_j^{img}$ based on the temporal features of the plurality of consecutive video frames $F_1^{img}, F_2^{img} \ldots F_j^{img}$; and update values for at least one of the plurality of weights $\theta$ based on the depth prediction for the video frame $F_{j+1}^{img}$.

In some embodiments, a 3D CNN may be used to extract the temporal features during the future depth prediction process.

While the pre-trained neural network model $f_\theta$ has not converged, operations 530 and 540 are performed. At operation 530, the system may compute a plurality of second weights $\theta_i'$, based on the plurality of consecutive video frames $D_i^{img}$ in each $D_i$, i=1 . . . N and the pre-trained neural network model $f_\theta$. For example, computing the plurality of second weights $\theta_i'$ may be based on the equation (1) below using $D_i^{img}$:

$$\theta_i' = \theta - \alpha \nabla L_{D_i}(f_\theta; D_i^{img}), i=1 \ldots N \quad (1)$$

where $\alpha$ represents a learning rate or step size, $L_{D_i}$ represents a loss computed based on $(f_\theta; D_i^{img})$, and $\nabla$ denotes a gradient operator.

At operation 540, the system may update the plurality of weights $\theta$, based on the plurality of training data $D_i=(D_i^{img}, D_i^{depth})$, i=1 . . . N and the plurality of second weights $\theta_i'$. For example, updating the plurality of weights $\theta$ may be based on the equation (2) below:

$$\theta = \theta - \beta \Sigma_{i=1}^N \nabla L_{T_i}(f_{\theta_i'}; D_i^{img}, D_i^{depth}) \quad (2)$$

where $\beta$ represents a learning rate, $L_{T_i}$ represents a loss computed based on $(f_{\theta_i'}; D_i^{img}, D_i^{depth})$, N is the total number of training data batches, $\nabla$ denotes a gradient operator, and $\Sigma$ is summation operator.

At operation 550, the system may receive a plurality of m new consecutive video frames $D_{new}=(D_1^{new_{img}}, D_2^{new_{img}} \ldots D_m^{new_{img}})$ with consecutive timestamps. The plurality of m new consecutive video frames may be obtained from a local memory device 404 or a remote database 430 via a network connection.

At operation 560, the system may predict a depth representation of video frame $D_{m+1}^{new_{img}}$ immediately subsequent to the video frame $D_m^{new_{img}}$ based on the updated plurality of weights $\theta$.

In some embodiments, predicting the depth representation of video frame $D_{m+1}^{new_{img}}$ may include: updating the plurality of second weights $\theta_i'$, based on the plurality of new consecutive video frames $D_{new}=(D_1^{new_{img}}, D_2^{new_{img}} \ldots D_m^{new_{img}})$ and the updated plurality of weights $\theta$; and generating the depth representation based on the updated plurality of second weights $\theta_i'$.

In some embodiments, updating the plurality of second weights $\theta_i'$ may be based on the equation:

$$\theta_i' = \theta - \alpha \nabla L_{D_i}(f_\theta; D_i^{new_{img}}), i=1 \ldots m$$

where $\alpha$ is the learning rate or step size, $L_{D_i}$ represents a loss computed based on $(f_\theta; D_i^{new_{img}})$, and $\nabla$ denotes a gradient operator.

In some embodiments, the depth values may be represented using a depth map.

The systems and methods described herein can quickly and efficiently generate or predict depth values for a video frame produced by monocular videos, as the system is configured to quickly adapt to novel video scenes using a meta-learning approach, with self-supervised training. The system can be used to predict depth values of a future video frame based on a few recent video frames from a current video, which may be used to generate a future state by a computing system on an autonomous vehicle to assist with navigation. The system is able to handle previously unseen video data with only a few batches of sample data, which means large-scale training datasets are not required for the system to adapt to new video scenes in order to generate estimated depth values for a frame in the new video.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method for predicting a depth for a video frame, comprising:
receiving a plurality of training data $D_i=(D_i^{img}, D_i^{depth})$, i=1 . . . N, wherein each $D_i$: $D_i^{img}=(D_{i1}^{img}, D_{i2}^{img} \ldots D_{it}^{img})$, wherein $D_{i1}^{img}, D_{i2}^{img} \ldots D_{it}^{img}$ each respectively represents a video frame from a plurality of t consecutive video frames with consecutive timestamps, the t consecutive video frames comprise one or more previous video frames and a current video frame, and $D_i^{depth}$ is a depth representation of a future video frame immediately subsequent to the video frame $D_{it}^{img}$;
receiving a pre-trained neural network model $f_\theta$ having a plurality of first weights $\theta$, wherein the pre-trained neural network model $f_\theta$ is pre-trained via a two-stage process comprising a current frame reconstruction training process and a future frame depth prediction training process, wherein the training process of the pre-trained neural network model $f_\theta$ comprises:
receiving a plurality of consecutive video frames $F_1^{img}$, $F_2^{img} \ldots F_j^{img}$ with consecutive timestamps;

setting a plurality of initial parameters of $f_\theta$ with random values to be the plurality of first weights $\theta$;
extracting a plurality of spatial features from the plurality of consecutive video frames $F_1^{img}$, $F_2^{img}$ ... $F_j^{img}$;
during the current frame reconstruction training process:
reconstructing each of the plurality of consecutive video frames $F_1^{img}$, $F_2^{img}$ ... $F_j^{img}$ based on the plurality of spatial features; and
updating values for at least one of the plurality of first weights $\theta$ based on the reconstructed video frames; and
during the future frame depth prediction training process:
extracting temporal features of the plurality of consecutive video frames $F_1^{img}$, $F_2^{img}$ ... $F_j^{img}$ based on the plurality of spatial features,
generating a depth prediction for a video frame $F_{j+1}^{img}$ immediately subsequent to the video frame $F_j^{img}$ based on the temporal features of the plurality of consecutive video frames $F_1^{img}$, $F_2^{img}$ ... $F_j^{img}$; and
updating values for at least one of the plurality of first weights $\theta$ based on the depth prediction for the video frame $F_{j+1}^{img}$;
while the pre-trained neural network model $f_\theta$ has not converged:
computing a plurality of second weights $\theta_i'$, based on the plurality of consecutive video frames $D_i^{img}$ in each $D_i$, $i=1 \ldots N$ and the pre-trained neural network model $f_\theta$; and
updating the plurality of first weights $\theta$, based on the plurality of training data $D_i=(D_i^{img}, D_i^{depth})$, $i=1 \ldots N$ and the plurality of second weights $\theta_i'$;
receiving a plurality of m new consecutive video frames $D_{new}=(D_1^{new_{img}}, D_2^{new_{img}} \ldots D_m^{new_{img}})$ with consecutive timestamps; and
predicting a depth representation of video frame $D_{m+1}^{new_{img}}$ immediately subsequent to the video frame $D_m^{new_{img}}$ based on the updated plurality of first weights $\theta$.

2. The method of claim 1, wherein computing the plurality of second weights $\theta_i'$ is based on the equation:

$$\theta_i'=\theta-\alpha\nabla L_{D_i}(f_\theta;D_i^{img}), i=1 \ldots N$$

wherein $\alpha$ represents a learning rate, $L_{D_i}$ represents a loss computed based on $(f_\theta; D_i^{img})$, and $\nabla$ denotes a gradient operator.

3. The method of claim 2, wherein updating the plurality of first weights $\theta$ is based on the equation:

$$\theta=\theta-\beta\Sigma_{i=1}^N \nabla L_{T_i}(f_{\theta_i'};D_i^{img},D_i^{depth})$$

wherein $\beta$ represents a learning rate, $L_{T_i}$ represents a loss computed based on $(f_{\theta_i'}; D_i^{img}, D_i^{depth})$, and $\nabla$ denotes a gradient operator.

4. The method of claim 3, wherein predicting the depth representation of video frame $D_{m+1}^{new\_img}$ comprises:
updating the plurality of second weights $\theta_i'$, based on the plurality of new consecutive video frames $D_{new}=(D_1^{new_{img}}, D_2^{new_{img}} \ldots D_m^{new_{img}})$ and the updated plurality of first weights $\theta$; and
generating the depth representation based on the updated plurality of second weights $\theta_i'$.

5. The method of claim 4, wherein updating the plurality of second weights $\theta_i'$ is based on the equation:

$$\theta_i'=\theta-\alpha\nabla L_{D_i}(f_\theta;D_i^{new_{img}}), i=1 \ldots m$$

wherein $\alpha$ is the learning rate, $L_{D_i}$ represents a loss computed based on $(f_\theta; D_i^{new_{img}})$, and $\nabla$ denotes a gradient operator.

6. The method of claim 1, wherein extracting the temporal features comprises using a 3D convolutional neural network to extract the temporal features.

7. The method of claim 1, wherein the depth representation of any video frame comprises, for one or more surfaces in the video frame, a depth value representing an estimated distance from the respective surface from a viewpoint.

8. The method of claim 7, wherein the depth representation of any video frame comprises a depth map for the video frame.

9. A system for predicting a depth for a video frame, the system comprising:
one or more processors; and
one or more memories coupled to the one or more processors unit, the one or more memories storing machine-executable instructions that, in response to execution by the one or more processors, cause the system to:
receive a plurality of training data $D_i=(D_i^{img}, D_i^{depth})$, wherein each $D_i$: $D_i^{img}=(D_{i1}^{img}, D_{i2}^{img} \ldots D_{it}^{img})$, wherein $D_{i1}^{img}, D_{i2}^{img} \ldots D_{it}^{img}$ each respectively represents a video frame from a plurality of t consecutive video frames with consecutive timestamps, the t consecutive video frames comprise one or more previous video frames and a current video frame, and $D_i^{depth}$ is a depth representation of a future video frame immediately subsequent to the video frame $D_{it}^{img}$;
receive a pre-trained neural network model ice having a plurality of first weights $\theta$, wherein the pre-trained neural network model $f_\theta$ is pre-trained via a two-stage process comprising a current frame reconstruction training process and a future frame depth prediction training process, wherein, during the training process of the pre-trained neural network model $f_\theta$, the machine-executable instructions, in response to execution by the one or more processors, cause the system to:
receive a plurality of consecutive video frames $F_1^{img}$, $F_2^{img}$ ... $F_j^{img}$ with consecutive timestamps;
set a plurality of initial parameters of $f_\theta$ with random values to be the plurality of first weights $\theta$;
extract a plurality of spatial features from the plurality of consecutive video frames $F_1^{img}$, $F_2^{img}$ ... $F_j^{img}$;
during the current frame reconstruction training process:
reconstruct each of the plurality of consecutive video frames $F_1^{img}$, $F_2^{img}$ ... $F_j^{img}$ based on the plurality of spatial features; and
update values for at least one of the plurality of first weights $\theta$ based on the reconstructed video frames; and
during the future frame depth prediction training process:
extract temporal features of the plurality of consecutive video frames $F_1^{img}$, $F_2^{img}$ ... $F_j^{img}$ based on the plurality of spatial features;
generate a depth prediction for a video frame $F_{j+1}^{img}$ immediately subsequent to the video frame $F_j^{img}$ based on the temporal features of the plurality of consecutive video frames $F_1^{img}$, $F_2^{img}$ ... $F_j^{img}$; and update values for at least one of the plurality of first weights θ based on the depth prediction for the video frame $F_{j+1}^{img}$;

while the pre-trained neural network model $f_θ$ has not converged:

compute a plurality of second weights $θ_i'$, based on the plurality of consecutive video frames $D_i^{img}$ in each $D_i$, i=1 . . . N and the pre-trained neural network model $f_θ$; and update the plurality of first weights θ, based on the plurality of training data $D_i=(D_i^{img}, D_i^{depth})$, i=1 . . . N and the plurality of second weights $θ_i'$;

receive a plurality of m new consecutive video frames $D_{new}=(D_1^{new_{img}}, D_2^{new_{img}} \ldots D_m^{new_{img}})$ with consecutive timestamps; and predict a depth representation of video frame $D_{m+1}^{new_{img}}$ immediately subsequent to the video frame $D_m^{new_{img}}$ based on the updated plurality of first weights θ.

10. The system of claim 9, wherein computing the plurality of second weights $θ_i'$; is based on the equation:

$$θ_i'=θ-α\nabla L_{D_i}(f_θ;D_i^{img}), i=1 \ldots N$$

wherein α represents a learning rate, $L_{D_i}$ represents a loss computed based on ($f_θ$; $D_i^{img}$), and $\nabla$ denotes a gradient operator.

11. The system of claim 10, wherein updating the plurality of first weights θ is based on the equation:

$$θ=θ-β\Sigma_{i=1}^{N}\nabla L_{T_i}(f_{θ_i'};D_i^{img},D_i^{depth})$$

wherein β represents a learning rate, $L_{T_i}$ represents a loss computed based on ($f_{θ_i'}$; $D_i^{img}$, $D_i^{depth}$), and $\nabla$ denotes a gradient operator.

12. The system of claim 11, wherein predicting the depth representation of video frame $D_{m+1}^{new\_img}$ comprises;

updating the plurality of second weights $θ_i'$, based on the plurality of new consecutive video frames $D_{new}=(D_1^{new_{img}}, D_2^{new_{img}} \ldots D_m^{new_{img}})$ and the updated plurality of first weights $θ_i'$; and generating the depth representation based on the updated plurality of second weights $θ_i'$.

13. The system of claim 12, wherein updating the plurality of second weights $θ_i'$ is based on the equation:

$$θ_i'=θ-α\nabla L_{D_i}(f_θ;D_i^{new_{img}}), i=1 \ldots m \quad (3)$$

wherein α is the learning rate, $L_{D_i}$ represents a loss computed based on ($f_θ$; $D_i^{new_{img}}$), and $\nabla$ denotes a gradient operator.

14. The system of claim 9, wherein during extracting the temporal features, the machine-executable instructions, in response to execution by the one or more processors, cause the system to: use a 3D convolutional neural network to extract the temporal features.

15. The system of claim 9, wherein the depth representation of any video frame comprises, for one or more surfaces in the video frame, a depth value representing an estimated distance from the respective surface from a viewpoint.

16. One or more non-transitory machine-readable media storing machine-readable instructions for configuring one or more processors to predict a depth for a video frame, the machine-readable instructions being configured to cause the one or more processors to:

receive a plurality of training data $D_i=(D_i^{img}, D_i^{depth})$, i=1 . . . N, wherein each $D_i$: $D_i^{img}=(D_{i1}^{img}, D_{i2}^{img} \ldots D_{it}^{img})$, wherein $D_{i1}^{img}, D_{i2}^{img} \ldots D_{it}^{img}$ each respectively represents a video frame from a plurality of t consecutive video frames with consecutive timestamps, the t consecutive video frames comprise one or more previous video frames and a current video frame, and $D_i^{depth}$ is a depth representation of a future video frame immediately subsequent to the video frame $D_{it}^{img}$;

receive a pre-trained neural network model 4 having a plurality of first weights θ, wherein the pre-trained neural network model $f_θ$ is pre-trained via a two-stage process comprising a current frame reconstruction training process and a future frame depth prediction training process, wherein, during the training process of the pre-trained neural network model $f_θ$, the machine-executable instructions, in response to execution by the one or more processors, cause the one or more processors to:

receive a plurality of consecutive video frames $F_1^{img}$, $F_2^{img} \ldots F_j^{img}$ with consecutive timestamps;

set a plurality of initial parameters of $f_θ$ with random values to be the plurality of first weights θ;

extract a plurality of spatial features from the plurality of consecutive video frames $F_1^{img}, F_2^{img} \ldots F_j^{img}$;

during the current frame reconstruction training process:

reconstruct each of the plurality of consecutive video frames $F_1^{img}, F_2^{img} \ldots F_j^{img}$ based on the plurality of spatial features; and update values for at least one of the plurality of first weights θ based on the reconstructed video frames; and during the future frame depth prediction training process:

extract temporal features of the plurality of consecutive video frames $F_1^{img}, F_2^{img} \ldots F_j^{img}$ based on the plurality of spatial features;

generate a depth prediction for a video frame $F_{j+1}^{img}$ immediately subsequent to the video frame $F_j^{img}$ based on the temporal features of the plurality of consecutive video frames $F_1^{img}, F_2^{img} \ldots F_j^{img}$; and update values for at least one of the plurality of first weights θ based on the depth prediction for the video frame $F_{j+1}^{img}$;

while the pre-trained neural network model $f_θ$ has not converged:

compute a plurality of second weights $θ_i'$, based on the plurality of consecutive video frames $D_i^{img}$ in each $D_i$, i=1 . . . N and the pre-trained neural network model $f_θ$; and update the plurality of first weights θ, based on the plurality of training data $D_i=(D_i^{img}, D_i^{depth})$, i=1 . . . N and the plurality of second weights $θ_i'$;

receive a plurality of m new consecutive video frames $D_{new}=(D_1^{new_{img}}, D_2^{new_{img}} \ldots D_m^{new_{img}})$ with consecutive timestamps; and predict a depth representation of video frame $D_{m+1}^{new_{img}}$ immediately subsequent to the video frame $D_m^{new_{img}}$ based on the updated plurality of first weights θ.

* * * * *